May 14, 1957 J. W. FAGAN 2,792,047
APPARATUS FOR FORMING OBJECTS BY THE WEIGHT THEREOF
Filed Feb. 21, 1955 3 Sheets-Sheet 1
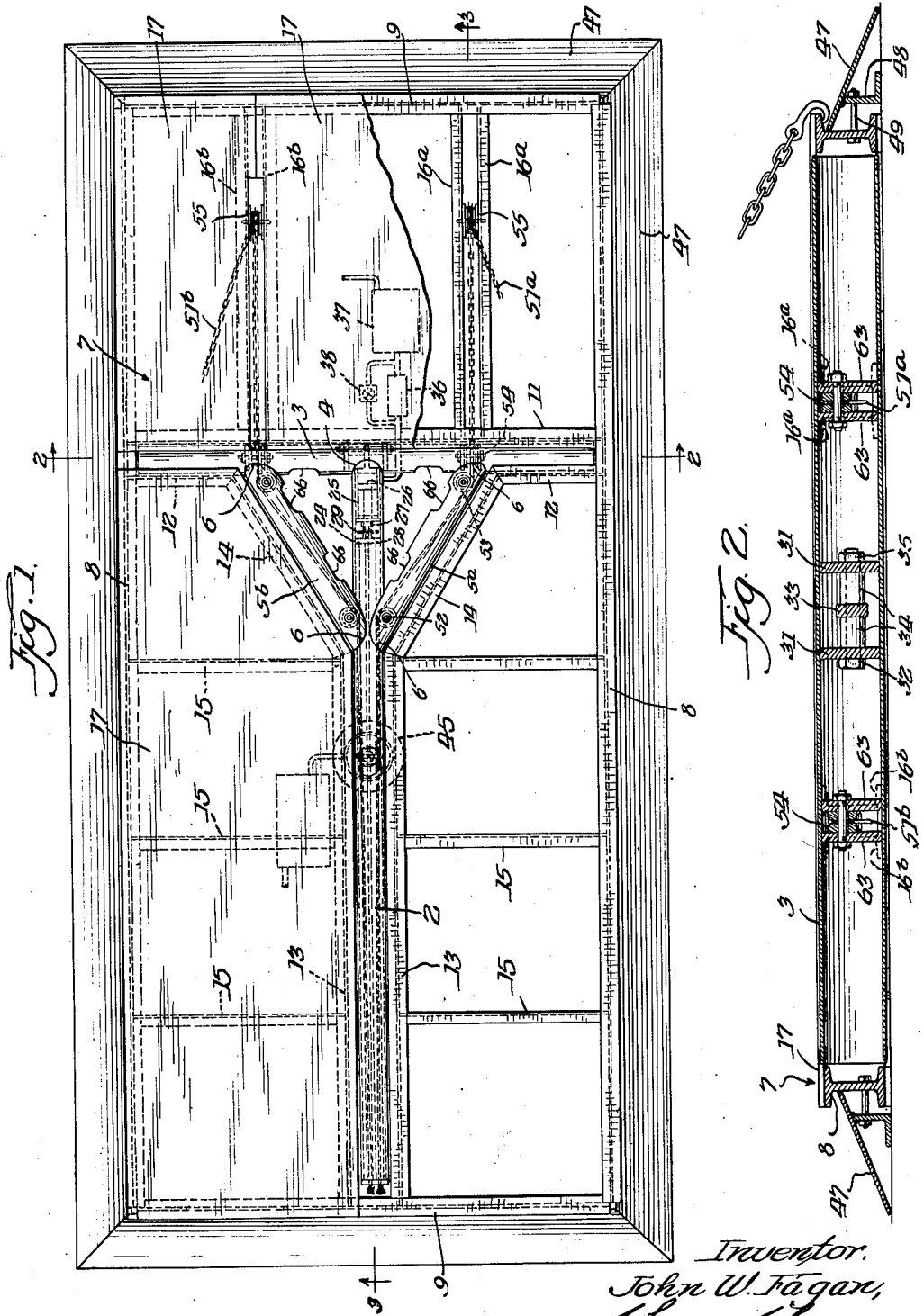

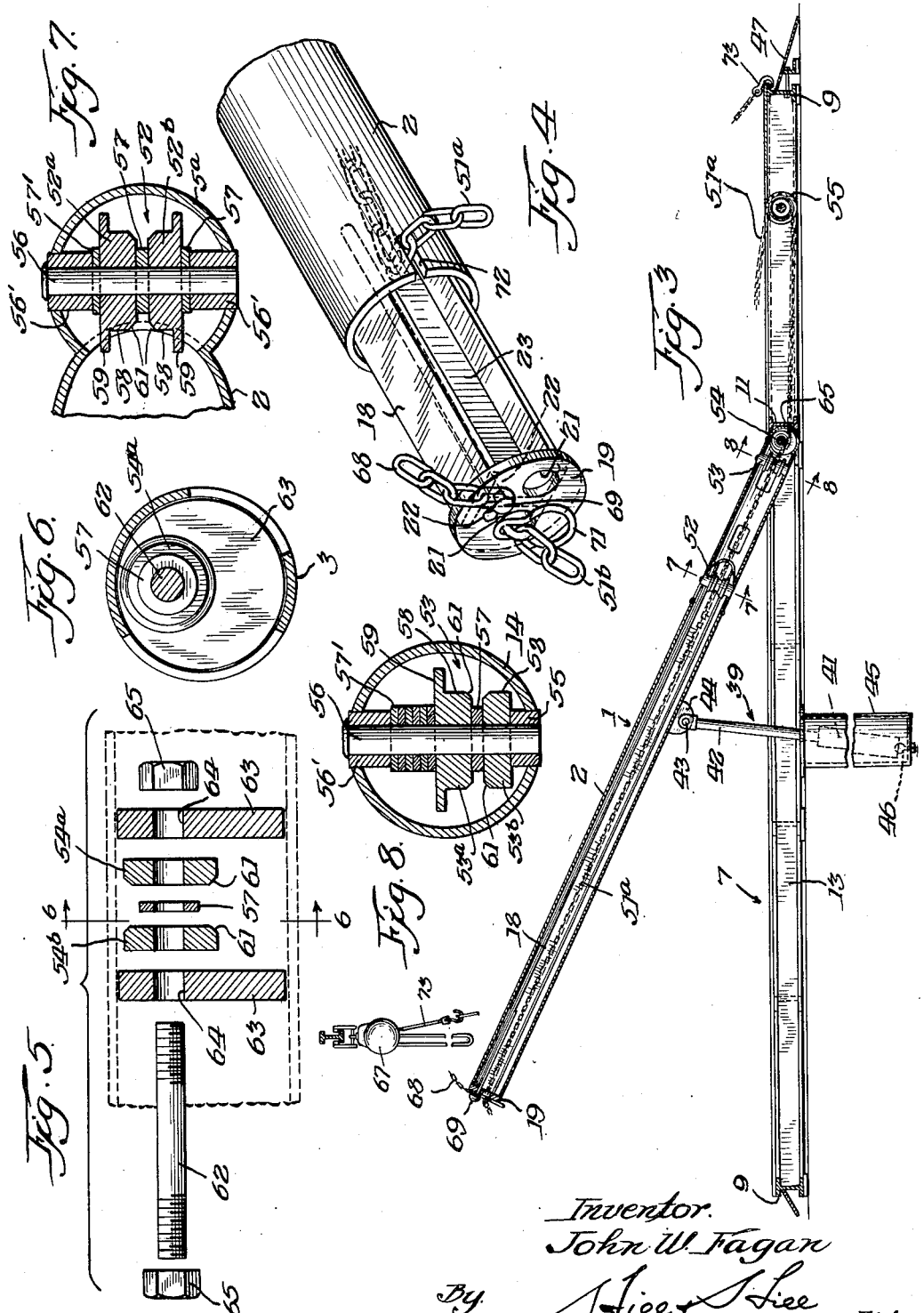

May 14, 1957   J. W. FAGAN   2,792,047
APPARATUS FOR FORMING OBJECTS BY THE WEIGHT THEREOF
Filed Feb. 21, 1955   3 Sheets-Sheet 3

Inventor.
John W. Fagan.
By Hill & Hill
Attys.

United States Patent Office 2,792,047
Patented May 14, 1957

2,792,047

APPARATUS FOR FORMING OBJECTS BY THE WEIGHT THEREOF

John W. Fagan, Chicago, Ill.

Application February 21, 1955, Serial No. 489,372

7 Claims. (Cl. 153—32)

The invention relates generally to forming and tensioning structures, and more particularly to the method and apparatus for applying forces in the forming and deforming of relatively heavy members.

The present invention is an improvement of my previous invention illustrated in my co-pending application, Serial No. 290,867, filed May 31, 1952, and entitled Method of Forming Objects and Apparatus Therefor, and is of particular use in connection with the straightening and forming of automobile frames, bodies, and the like. Utilization of the teachings of my prior application has definitely established the superiority of the method described in such co-pending application over those previously utilized in the automobile repair field. However, the apparatus therein illustrated, employing a movable beam, while vastly superior to prior machines, also had several inherent limitations. One such limitation was the fact that the object being worked on was anchored at a fixed point or points and forces applied in a single direction, resulting in a possible tendency of the object to shift in position as the apparatus is brought into operative position, thus all take-up action as well as all tension forces were applied to the object in a single direction with respect to a fixed point or points. In the present invention, corresponding points of connection and actuation are movable and may be considered self-adjusting or automatic in operation, resulting in a force equalization at opposite ends of the tensioning operation.

In my prior construction, the tensioning operations on vehicles were controlled primarily by the lowering of the vehicle and the apparatus, although a supplementary control could also be effected by the extension or retraction of the actuating beam; this control, however, being normally utilized to remove slack in the connecting cables. However, as the mechanical advantage was considerable, a fairly high degree of skill on the part of the operator was necessary to insure the application of desired forces and prevent the application of excessive forces to the structure being worked upon. In other words, as the control means of the device was of relatively low sensitivity, it was comparatively easy for an operator to apply excessive forces on the object which, in some cases, might result in further damage to the object.

The present invention therefore has among its objects the production of a straightening or tensioning apparatus, which eliminates the limitations referred to with respect to my previous device, wherein the tension forces are applied equally in opposite directions to the object, the construction being such that four available self-adjusting points are provided instead of two fixed and two self-adjusting points as illustrated in my prior application. As a result, the object or vehicle being worked upon has substantially no tendency to shift as the apparatus is placed in operative position or as the forces are applied thereto other than movement associated with the object in connection with the straightening or forming operations, as distinguished from the setting up operations prior to actuation of the apparatus and may substantially automatically adjust to the strengthening forces.

Another object of the invention is the production of a machine of the type involved having substantially twice the effective extensional range of my prior machine and in which the forces may be materially increased.

Another object of the invention is the production of such an apparatus which while capable of exerting tons or pressure as may be required, utilizes a novel method and means of control whereby the applied pressures may be accurately and easily adjusted within a few pounds.

A further object of the invention is the production of a forming apparatus which is substantially self-contained so that it may be manufactured and sold as a complete machine to be set up wherever there is sufficient floor space, as distinguished from my prior apparatus which was illustrated as being of a permanent rather than a portable structure.

A further object of the invention is the production of such a novel apparatus which is so designed that chains or other elements may be readily engaged with the machine for hold-down or other operations in connection with the actuation of the machine, whereby the forces may be directed or concentrated at desired points on the object.

A further object of the invention is the production of a novel sheave construction and arrangement whereby free efficient chain or cable action is achieved in the apparatus.

Many other objects and advantages of the construction herein shown and described will be obvious to those skilled in the art from the disclosure herein given.

To this end, my invention consists in the novel construction, arrangement, combination of parts and methods herein shown and described, and more particularly pointed out in the claims.

In the drawings, wherein like reference characters indicate like or corresponding parts:

Fig. 1 is a top plan view of a forming apparatus constructed in accordance with the present invention;

Fig. 2 is a transverse sectional view taken approximately on the line 2—2 of Fig. 1;

Fig. 3 is a longitudinal sectional view taken approximately on the line 3—3 of Fig. 1;

Fig. 4 is a perspective view of the free end portion of the operating beam;

Fig. 5 is an enlarged sectional view through one of the sheave structures taken approximately on the line 2—2 of Fig. 1;

Fig. 6 is a transverse sectional view of the assembled sheave structure taken approximately on the line 6—6 of Fig. 5;

Fig. 7 is a sectional view through one of the other sheave structures taken approximately on the line 7—7 of Fig. 3;

Fig. 8 is a similar sectional view taken approximately on the line 8—8 of Fig. 3;

Figure 9:
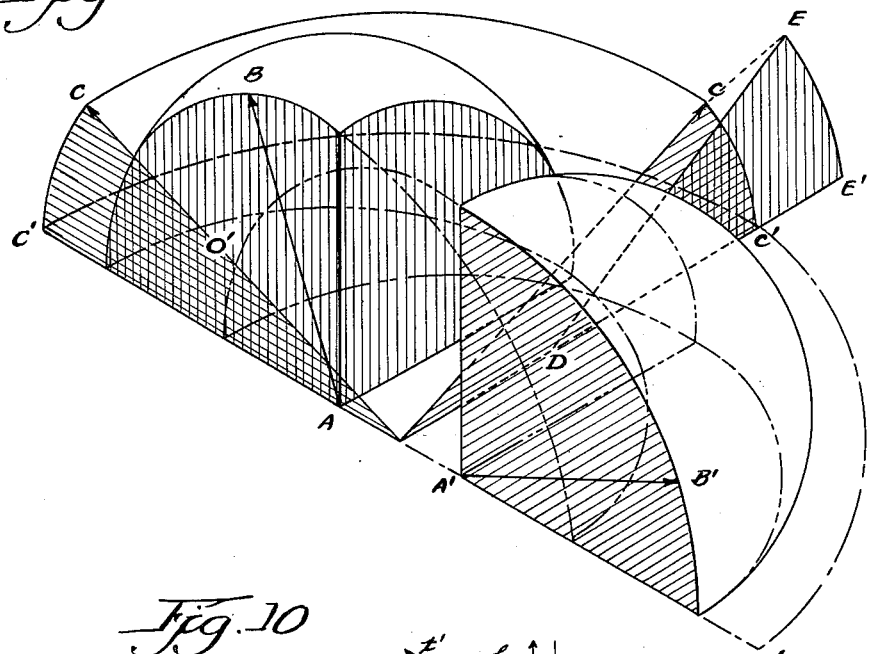
Fig. 9 is a perspective diagrammatic figure illustrating the theoretical functional relationships between various operating points involved in the practice of applicant's novel method and use of the apparatus.

Referring to the drawings and more particularly to Figs. 1, 2, and 3, the embodiment of the invention illustrated utilizes a movable beam, indicated generally by the numeral 1, comprising an elongated tubular body portion 2 to which is rigidly connected at one end thereof a base or cross member 3, the latter being secured by welding 4 or other suitable means to the member 2. The structure may be reinforced by a pair of diagonally extending brace members 5a and 5b, also of tubular construction, and rigidly secured to the members 2 and 3 by welding 6 or the like, thus forming a T-shaped member or beam having considerable rigidity.

The beam 1 is mounted in a generally rectangular base structure, indicated generally by the numeral 7, which in the embodiment of the invention illustrated is fabricated from a plurality of steel structural elements such as I-beams, angles, plates, and the like.

Referring to Figs. 1 and 2, the base 7 comprises longitudinally extending side members 8 and end members 9 which may be formed from I-beam stock, the end and side members being secured together at their respective junctures by welding or other suitable means to form a substantially unitary structure. Also connecting the two side members 8 is a cross member 11, also formed from an I-beam as illustrated in Fig. 3. Positioned adjacent each side member 8 and extending inwardly therefrom in spaced parallel relation with respect to the beam 11 are a pair of I-beam sections 12, the latter being constructed from the same stock as the beam 11 and spaced a sufficient distance apart to receive the member 3 of the beam 1, as generally illustrated in Fig. 3, whereby the beam may be rotated about the axis of the member 3, the members 11 and 12 in effect forming a bearing or journal for the member 3, whereby the member may be positioned in a generally horizontal position between the side members 8 or rotated into an elevated position such as illustrated in Fig. 3. As illustrated in Fig. 1, the base 7 is provided with a pair of longitudinally extending members 13 which as illustrated may take the form of I-beams, the latter being spaced apart a sufficient distance to receive the member 2 of the beam when the latter is in a horizontal position, thus in effect defining a receptacle for the latter. The inner end of each member 13 is connected by a respective diagonally extending member 14 to the sections 12, the members 14 likewise being formed from similar stock to that of the members 12 with the members 14 extending generally parallel to the base members 5a and 5b. Extending between each side frame 8 and longitudinally extending members 13 may be a plurality of reinforcing cross members 15 which in the embodiment of the invention illustrated are formed from C or channel-shaped members. Extending between the cross member 11 and the adjacent end member 9 of the base are two pairs of channel members 16a and 16b, respectively, each pair of members extending in spaced parallel relation, parallel to the side members 8, and in approximate transverse alignment with the junction of each brace member 5a or 5b with the member 3. As illustrated in Fig. 2, the members 16a and 16b may be constructed from C-beams or channel members, the members being arranged with their webs in opposed relation and the flanges of each pair of members extending in opposite transverse directions.

The base structure 7 may be covered by a plurality of plates 17 which are suitably shaped to cover the frame structure, the outer edges of the plates being substantially co-extensive with the outer edges of the top flange of the I-beams 8 and 9. The plates 17 are suitably shaped to conform to the edges of the I-beams 13 and 14 as well as the beam 11 whereby the receptacle formed in the base 7 for the beam 2 is exposed to permit withdrawal and insertion of the beam into the base. Likewise that area of the beam 1, defined by the brace members 5a and 5b, and base member 11 may be covered with a similar plate, not illustrated, whereby the apparatus presents a more or less continuous horizontal surface when the beam is in a horizontal direction.

Positioned in the member 2 of the beam and slidably carried therein is an I-beam 18, the latter being of a size to more or less snugly fit the internal periphery of the member 2. Rigidly mounted on the free end of the member 18 is an end plate 19, the latter being secured to the member 18 by welding or other suitable means, and provided with a pair of relatively large openings 21, and a pair of relatively small openings 22 therein, with the openings of each pair being disposed on opposite sides of the web 23 of the beam 18 as illustrated in Fig. 4. Mounted on the inner end of the beam 18 is a similar disk 24, and positioned in the inner end of the member 2 adjacent the disk 24 is a hydraulic cylinder 25 having a piston 26 operatively connected to a piston rod 27. As illustrated in Figs. 1 and 2, the disk 24 may be provided with a yoke 28 adapted to receive the free end of the piston rod 27 which may be connected to the yoke by a pin 29, the length of the latter being such that the side walls of the tube retain it in operative position. The cylinder 25 may be anchored to the member 3 by any suitable means, as for example a pair of disks or plates 31, the latter having a bolt 32 extending therethrough which passes through a shank 33 extending rearwardly from the cylinder 25, tubular spacers 34 being interposed between the shank 33, and the plates 31 with the elements being maintained in assembled relation by a nut 35 threaded on the end of the bolt 32. Thus, the member 18 within the tube 2 may be extended from or retracted into the tube 2 by actuation of the piston 26. The cylinder 25 may be actuated by a pump 36, indicated diagrammatically in dotted lines in Fig. 1. As hereinafter described, the pump 36 may be pneumatically actuated and may be operatively connected to a reservoir tank 37, and suitable valves including a suitable by-pass valve 38 may be associated with the pump and reservoir to control the movements of the piston. The pump 36, valve 38, and associated parts may be readily procured and the specific details of construction thereof form no part of the present invention. Pumps of this type may be operated off of an air line, which are always available in shops of the type which would employ such an apparatus, and the elements may be obtained in sizes which will enable their installation within the base 7. As illustrated in Figs. 1 and 3, the beam 1 may be suitably counterbalanced by a counterbalance mechanism, indicated generally by the numeral 39, which in the embodiment of the invention, as illustrated, is shown as being of a hydraulic type comprising a cylinder 41 having a piston rod 42 extending therefrom, the free end of the latter being pivotally connected as indicated at 43 to a downwardly depending flange or plate 44 welded or otherwise rigidly secured to the tube 2. The cylinder 41 may be supported in a container or receptacle 45, which may be welded or otherwise rigidly secured to the base 7 with the inner end of the cylinder being pivotally supported from the container 45, a ball and socket connection 46 being illustrated in Fig. 3. The hydraulic cylinder 41 may be pneumatically actuated by a pump similar to the pump 36, which may be provided with suitable valve mechanism whereby the pressure exerted is merely sufficient to counterbalance the beam 1 which may be manually moved with relatively little effort to any desired angle of rotation. Preferably, any by-pass valve associated therewith should be of the type which will resist sudden changes in fluid pressure, the structure in effect functioning like a shock absorber to eliminate any possibility of a sudden undesired downward movement of the beam, with the resulting snubbing action being such that ample time is afforded an operator to get out from under the beam or an object connected thereto.

To provide means for readily moving a vehicle onto the base 7, the latter may be provided with a peripheral ramp 47 extending around the sides and ends of the base 7, the ramp 47, in the embodiment illustrated, being supported on angle members 48 having their upper edges welded or otherwise secured to the ramps and secured to the base by bolts 49 passing through the web of the I-beams 8 and 9 and through the upwardly extending leg of the angle 48.

Extending through the tube 2 at opposite sides of the I-beam or member 18 are a pair of cables such as chains 51a and 51b, each chain extending along the tube 2 to the juncture of the brace members 5a and 5b, thence through the adjacent brace member to the member 3, and from the member 3 transversely through the beam 11 between the channel members 16a or 16b as the case may be. To permit such passage of the chains 51, the tube body 2 and member 3 are provided with openings of adequate size to permit free passage of the chains. Associated with each of the chains are four sheaves 52, 53, 54, and 55. Each sheave 52 is positioned adjacent the juncture of a respective brace member 5a or 5b with the tube 2 and, in similar manner, each sheave 53 is positioned adjacent the juncture of one of the brace members with the tubular base member 3. Each of the sheaves 52 and 53 are rotatable on axes extending generally perpendicular to the plane of the beam 1, and positioned in the member 3 adjacent each sheave 53 is a sheave 54, the details of which are illustrated in Figs. 5 and 6. Fig. 7 illustrates details of each sheave 52 while Fig. 8 illustrates details of each sheave 53. Referring to Figs. 7 and 8, it will be noted that the construction of the sheaves 52 and 53 and the mounting thereof are generally similar, each comprising a pair of sheave halves 52a, 52b, and 53a, 53b, rotatably mounted on respective pins 56 supported in hubs 56', welded or otherwise rigidly secured to their respective supporting members. Each pair of sheave halves are suitably spaced by a washer 57 and suitable washers 57' may be positioned at either or both sides of the sheave to properly position the latter within the tubular member carrying the same. In the case of the sheaves 53, the lower hub 55, in the embodiment illustrated, is axially shorter than the upper hub to position the sheave adjacent the bottom of the tube 5a or 5b. In the embodiment illustrated, the sheave halves 52a and 52b are alike and of substantially the same size and shape as the upper sheave half 53a. Such sheave halves each comprise a cylindrical portion 58 having an outer flange 59 and a beveled inner edge 61. The sheave half 53b, however, is provided with a cylindrical portion 58 of somewhat less axial thickness than the portion 58 of the sheave half 53a, and the flange 59 is omitted. The inner edge, however, is provided with a similar bevel 61.

Referring to Figs. 5 and 6, it will be noted that each of the pulley structures 54 comprise a pair of sheave halves 54a and 54b which are similar in shape to the sheave half 53b, having beveled inner edges 61. The halves 54a and 54b may be supported on a threaded shaft 62 which passes through a pair of cylindrical disks 63, the latter being of approximately the same diameter as the internal diameter of the member 3, with the holes or bores 64 through which the shaft 62 extends being offset as clearly illustrated in Fig. 6. A spacer 57 is interposed between the two halves 54a and 54b and the structure held in assembled relation by nuts 65 threaded on the ends of the shaft 62. To facilitate the assembly of the sheaves in the beam 1, work holes 66 may be provided in the brace member 5a, 5b and the member 3.

Referring to Fig. 3, it will be apparent that the sheaves 52, 53, and 54 permit the free movement of the respective chains 51a and 51b through the beam 1, and following the passage of the chains through the member 3, each chain extends through a respective hole 65 in the I-beam 11 and thence rearwardly to a respective sheave 55, the latter being similar in general construction to the sheave illustrated in Fig. 7, utilizing two like halves of larger diameter than the halves 52a and 52b, with each sheave being rotatable on a shaft 54 extending through the webs of the beams 16a and 16b, respectively, a spacer or collar 57 being interposed between each pair of sheave halves.

In use, the present apparatus may be connected to the object to be formed or reformed in the same general manner as described in the application heretofore referred to. For example, assuming the object is a vehicle which is to be straightened, the vehicle would be moved onto the base 7 and over the beam 1, as roughly indicated in dotted lines in Fig. 12. The vehicle may then be elevated by a hoist 67, illustrated in Fig. 3, the beam raised into the desired position and the chains 51a or 51b or both, as may be desired, operatively connected to the vehicle and the extension member 18 connected to the opposite end of the vehicle by the chain 68 which may be secured to the member 18 by a headed rod 69 inserted through a chain link and one of the holes 22.

As illustrated in Fig. 4, the chain 51b may be secured to the end plate 19 of the beam by a generally keyhole-shaped ring 71, the narrow or neck portion of which has an internal width approximately the thickness of a chain link whereby the latter may enter the neck, and the next link interlocked with the ring.

The chain 51a could be secured to the member 19 in similar manner, or in some cases where desired, may be locked to the end of the tube 2 as illustrated in Fig. 4, the tube having a longitudinally extending slot 72 running to the tube end into which a chain link may be inserted, the next link forming an interlocking connection. Obviously, with the latter arrangement such chain will impart a fixed holding action on the object with no take-up occurring as the beam is moved. The opposite side of the beam may also be provided with a similar slot 72 for use, when desired, with the chain 51b.

Following the completion of the connection, the slack may be taken out by extending the member 18 of the beam. If desired, the beam may then be operated similarly to that illustrated in my co-pending application by the closing of the valves associated with the pump and cylinder 25, rendering the beam of relatively fixed length, following which the hoist may be actuated to lower the vehicle, resulting in the application of tension forces to the object from the mathematical advantage or leverage between the radii R and R'.

In connection with the operation of the device in accordance with my new method, it is believed that a brief review of prior straightening methods is desirable. Prior to the invention illustrated in my co-pending application heretofore referred to, straightening operations, as for example on vehicles and the like, were accomplished by means of relatively heavy equipment in which a deformed member was clamped or rigidly held in position at opposite ends or sides of the deformed portion and pressure applied to the deformity while the element was so held in otherwise rigid position. In the case of a vehicle, for example, which has been in a collision, either with a moving or stationary object, the damage substantially invariably does not consist of a single deformed element but of a plurality of elements which were more or less simultaneously deformed as a result of the collision. Actually, if a very slow motion picture could be taken of such a collision it would in all probability disclose that the various deformations occur consecutively or in pairs or groups which occur consecutively. In other words, upon the first impact the most readily deformable member or perhaps two or more members will give way until the resistance exerted by the deforming action increases beyond the deformation resistance of another element or group of elements. Such increase in resistance in the first element or group of elements may result in a glancing off of the force whereby the deforming forces are directed against another element or group of elements, relieving any immediate further deformation of the first set. This may continue until the entire force of the impact has been dissipated, involving a relatively large number of elements, the deformation of a large portion of which occur from the application of vector forces which may be applied to some of the elements in different directions than that of the original impact.

It is believed apparent that due to the nature of an impact such as that described, the inability of previous devices to approximate forces, in reverse to those which caused the deformation, eliminated any possibility of simultaneously straightening or reforming a plurality of members into their original positions. Prior straightening operations thus primarily consisted of attempting to straighten individual deformations by successive applications of forces to the respective elements. It thus was necessary for the operator to set up the equipment with respect to one element, clamping the same in rigid relation adjacent undeformed portions and then apply pressure in a single direction to the deformed portion. It will be apparent that in such an operation it is necessary to more or less disassociate the elements being worked on from other elements insofar as this may be possible from a practical standpoint, otherwise such other elements may interfere with the straightening of the element being operated upon. It will be appreciated that with such type of operation any attempt to straighten a number of elements simultaneously could very easily result in undesired deformation of certain elements which might be restricting the attempted operation. For the above reasons, prior to applicant's invention disclosed in his co-pending application, straightening operations in most cases consisted of a series of set-ups or applications of the straightening mechanism to one or more elements which was not only time-consuming and expensive from a labor standpoint, but also hard work as the devices were of necessity relatively heavy due to the nature of the forces involved. A further complication in such devices was the inability to readily vary the direction of force applied to the same element as this usually required a complete change in set-up. Consequently, the operator might have to set the machine up several times on the same element before the desired operation was accomplished. Consequently, prior equipment could not function to simultaneously perform a plurality of straightening functions, as for example where the front end of a vehicle has been struck, bending the steering gear, the frame, fender, etc., and oftentimes increased time and labor were occasioned by the fact that parts of the vehicle had to be disassembled before a desired element could be effectively reached for straightening.

The invention described in my co-pending application and the present invention approach the problem from a totally different concept than previous devices, one of the main purposes of my inventions being to endeavor to approximate reverse forces, insofar as possible, on the object being straightened to that which created the deformation. Theoretically, if such force could be exactly duplicated as to the angular relationship thereof with respect to the object, but in tension rather than compression, a single application of force to the vehicle could result in a complete straightening of all elements in substantially one operation. Obviously, the complete attainment of this result cannot be reached in most cases due in part to the inability of the operator to completely visualize all of the forces and their directions involved in the original impact, as well as vector forces resulting therefrom. In connection with this new concept a totally different technique with respect to the vehicle may be employed. Obviously, when a vehicle is struck by another vehicle or hits a stationary object, the forces of impact may be expended by movement of the vehicle in substantially any direction usually other than any appreciable distance downward, and the vehicle at the instant of impact and immediately thereafter is in effect a free agent. On the other hand, straightening apparatus heretofore has endeavored to maintain portions of elements stationary while a deformation is attempted to be removed therefrom, which of course is directly contrary to the manner in which the deformation arose and often resulted in a deterioration in the metal whereby the straightened element was considerably weaker than it had originally been and where a previously undeformed element was additionally stressed or deformed because it opposed the supposed connective force.

With my previous invention these various factors were attempted to be taken into consideration. The operation was such that a large portion of the normal static stresses on elements of the vehicle were relieved and the vehicle was so positioned that it had a degree of freedom of movement during the straightening operation, permitting it to in effect follow the reforming action. However, with my previous invention, force was applied to the object in a single direction, the object being held stationary in the opposite direction. In such case the tension forces applied to the elements to be straightened were normally developed through the forces of gravity, the arrangement being such that the weight or gravitational forces were transferred to tension forces in the object, a considerable mechanical advantage being obtained from the relation of certain pivotal centers of the object and the beam. As the object was held at one end by chains or other members fastened to stationary elements, such end of the object was stationary in the direction of the tension forces and all elongation of the element under the application of tension forces appeared as movement of the object in a single opposite direction. It will be apparent that the connecting chains initially have a normal amount of slack therein which may be taken up by the extension of the beam, such take-up of course also being in the single direction and resulting in a movement of the object in such direction until such slack is taken up. Also as the rear point of connection was fixed, freedom of movement of the object was to a certain extent restricted.

Figure 10:
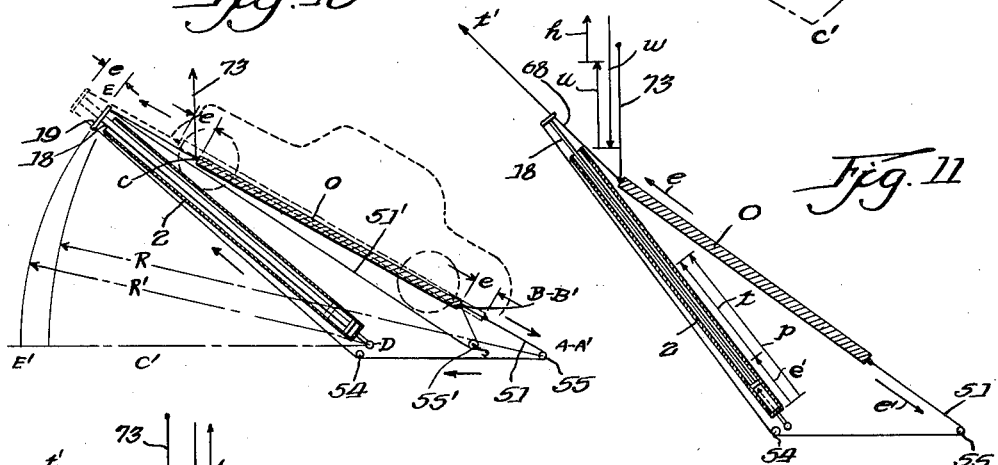
Fig. 10 is a diagrammatic figure illustrating a longitudinal sectional view similar to Fig. 3 of the operating elements illustrating the functional relationships involved in the present invention.

In the present invention, the chain or other connecting members 51 as illustrated diagrammatically in Fig. 10, extend from the object to the rear sheave 55, around the pulley 54 to the end member 19 of the beam. It will be apparent that when the beam 18 is extended from the tube 2, the chain 68 connecting the beam 18 with the front end of the object will travel in the same direction as the extension of the beam by an equal amount, and in like manner the chains 51 will be moved in the opposite direction or shortened by an equal amount, such amounts being designated by $e$ in Fig. 10. It will be apparent that with this construction any extension of the beam 18 from the tube 2 tends to impart twice that amount of elongation to the object, thus doubling the effective travel of the beam 18. The chains 51 and 68 normally would be connected with approximately equal slack so that upon extension of the member 18 such slack will be taken up practically uniformly at opposite ends of the object and there will be substantially no tendency of the object to shift its position in the direction of the tensioning forces as was the case with my prior construction. Also referring to Fig. 10, it will be apparent that due to the difference in centers of the radii R and R', respectively representing the radii of the object as it pivots about the sheave 55 and the radius of the beam 1 about the axis of the member 3, such pivotal movement will result in a mechanical or mathematical leverage resulting in tension forces on the object as the latter and the beam are rotated in a downward direction about their respective axes, corresponding to that resulting in my previous construction.

Referring to Fig. 1, the hydraulic cylinder 25 is connected with a suitable pump 36 and reservoir 37, an adjustable by-pass valve 38 being associated therewith. The arrangement of these elements is such that when the by-pass valve 38 is adjusted to a predetermined pressure, the desired pressure will be continuously maintained in the cylinder 25, additional fluid entering the cylinder as the member 18 is extended and permitting the displacement of fluid from the cylinder if the pressure on the member 18 and thus on the piston of the cylinder exceeds that for which the valve is adjusted. Consequently, if the mechanism is adjusted for example, to four thousand pounds pressure, such amount will be exerted continuously on the piston, the piston extending if the resistance thereon is less than such pressure or retracting if the resistance exceeds such pressure. By means of this arrangement the applied forces to the object, as the latter and the beam are moved downwardly, may be radially controlled, eliminating any possibility the applied forces on the object exceeding that for which the mechanism is adjusted. It will also be apparent that with this construction the member 18 will automatically extend, taking up any slack in the chains, etc., resulting from elongation or movement of the object so that the maximum travel or amount of mechanical advantage of the structure may be utilized and reducing the number of passes which might otherwise be required on the object. These operations may be explained and understood from a reference to Figs. 11 and 12, the former illustrating the approximate relationships and magnitudes of the forces on the apparatus and the object prior to downward movement of the beam, while Fig. 12 illustrates the changes in magnitudes of the forces as the beam is rotated downwardly.

Figure 11:
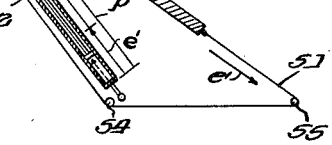
Fig. 11 is a diagrammatic figure of the approximate initial force relationships which may exist in the practice of the present invention.
Figure 12:
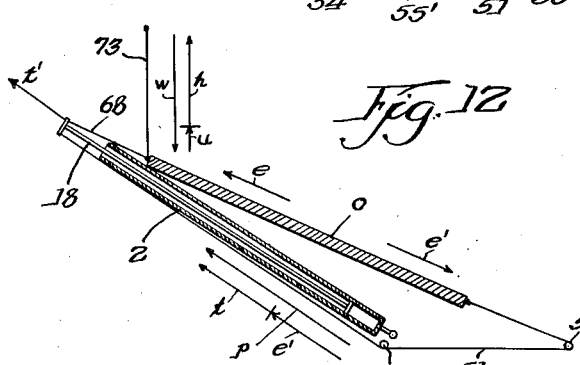
Fig. 12 is a diagrammatic figure similar to Fig. 11 but illustrating the approximate subsequent force relationships which may exist following a lowering of the beam.

Referring to Fig. 11, it is assumed that the object $o$ is elevated at its forward end by a cable or connector $x$ which is carried by a suitable hoist by means of which the object may be elevated, as illustrated. The cable 51 may be connected at the rear or lower portion of the object, extending around its respective sheaves and connected to the end of the member 18, the latter also being connected, by the cable 68, to the opposite end of the object. It will be apparent that as the member 18 is extended under the action of the hydraulic cylinder 25 the beam will tend to rotate upwardly about its pivotal axis until the pressure for which the pump mechanism has been adjusted is reached and offset by other forces. The respective vector arrows of Fig. 11 illustrate the approximate relationship and magnitudes of forces which exist at such time. Thus, $p$ represents the maximum pump pressure as adjusted, a large portion $t$ of which is exerted on the cable 68 as represented by $t'$, the latter being a vectoral quantity due to the angular relation of the cable 68 with respect to the axis of the member 1. The arrow W represents the downwardly directed forces at the hoist cable 73 which in the example result from the weight of the object or vehicle $o$. A portion of the vectoral forces $t'$, due to the mechanical or geometrical arrangement of the elements, has a vertical or upward component $u$ which opposes the downward force W and thus in effect tends to relieve the downward tension forces on the cable 73 by such amount, whereby the tension forces in the latter cable $h$ represent the amount of the vehicle weight which is being supported by the hoist. The remainder of the tension force $t'$ has an elongating force $e$ which is equal to the oppositely directed force $e'$ in the cable 51. In other words, the force exerted by the hydraulic cylinder 25 is divided between the cable 51 and the cable 68, that of the latter in turn having two components, one of which exerts a tension force on the object and the other of which is a vertical component offsetting a portion of the force W. Assuming the structure approaches a static condition under the adjusted pressure, if the hoist is then released permitting the structure to move downwardly under the applied weight $h$, the changes in the angular relations of the set-up will result in a shifting or transfer of the forces exerted by the beam to oppose the weight of the vehicle to an increase in the tension forces on the object. Thus, as illustrated in Fig. 12, the magnitude of the vector $h$, representing the amount of the vehicle weight $w$ carried by the hoists 67 has increased and the opposing force $u$ correspondingly decreased. At the same time the tension forces $e$ and $e'$ on the object have accordingly increased.

It will be appreciated that if the weight applied to the structure as the latter is rotated downwardly results in an excessive amount of force on the member 18 exceeding the pressure for which the pump is adjusted, the member 18 may retract in the tube 2 until the pressure again reaches the pre-set value. Consequently the setting of the pump mechanism provides a definite limit on the maximum forces which may be applied to the object during the operation of the device. This construction also in effect provides a micrometer adjustment of the pressures applied to the object and enables an operator to reform or straighten portions of an object successively. Recalling the previous reference to the order in which deformations normally take place following an impact, it can readily be demonstrated by the present invention that the straightening operation may take place in a similar reverse sequence whereby the deformation of least resistance initially returns to its original position, following which the deformation of next resistance follows until finally the deformation of greatest resistance remains at the last.

While it was obvious by the use of my previous invention that a considerable number of different deformations in one or more elements apparently could be simultaneously reformed, the action was so rapid that successive forming movements could not be ascertained by the eye and it appeared that all reforming movements may have occurred simultaneously. However, by means of the present invention, the manipulation of the pump mechanism provides a sufficiently fine adjustment of the application of forces to the object that the device may be adjusted to initially straighten one element or group of elements, following which additional pressure may be applied to straighten the next element or group, and in actual operations different stages of the straightening operation have been controlled by differentials of less than five pounds pressure. I am of the opinion that it is highly probable that experience hereafter gained by future use of the present invention may lead to such scientific refinements in its use or construction, that by determining the critical pressure or pressures required in straightening an object, the approximate speeds and relative directions of the deformed object with another object at the time of impact may be estimated within reasonable tolerances.

It will be appreciated that while Figs. 10, 11, and 12 illustrate an object $o$ lying in substantially a common plane with the beam 1, the relationship of the object may vary considerably as will the position of the cables connecting the object to the apparatus and to the hoist. A comparison of the flexibility of such connections and possible relationships is diagrammatically illustrated in Fig. 9 wherein the shaded spherical segments indicate the approximate range of the various points involved in the respective geometric relationships. In this figure the radii AB and A'B' represent the rear connections achieved by the chains 51a and 51b, and referring to Fig. 9 it will be noted from the broken lines connecting the respective spherical segments, that the illustrated portion generated by radius AB represents only half of the possible range, the other half extending into intersection with that portion of the generation of the radius A'B', as indicated by the broken line continuations, and in like manner that half of the segment generated by radius A'B' not illustrated would intersect the illustrated segment of the generation of AB, as indicated. The point $c$ illustrated in Fig. 10 designating the point of connection of the object with the beam 1 theoretically may fall in the segment defined by the radius O', only half of the generation being illustrated in Fig. 9 with the other half extending on the opposite side of the center of generation, as indicated in the broken line continuation. Similarly the inclination of the radius O' is not necessarily limited to that illustrated but may be considerably greater on occasion. In this figure the radius DE represents the beam 1 and of course the inclination thereof may also exceed that illustrated, the movement of the beam 1, however, being in a vertical plane as defined by the points DE, E'. In this figure the mechanical advantage resulting from the difference in the radii rr' would be represented by the theoretical difference between the distance CE and the distance C'E'. It will be noted that in my prior invention the radii AB and A'B' in any particular operation were of fixed length, while in the present invention they are of variable length and may change or adjust as the device is operated. While the diagram of Fig. 9 illustrates the various relations over 180° horizontally, it will be appreciated that insofar as an object is concerned, as for example—a vehicle, 360° coverage of the object may be achieved by reversal of the object relative to the apparatus.

In some instances it may be desirable to increase the mechanical advantage of the structure which can be accomplished in several ways, one of which is illustrated in Fig. 10 wherein an auxiliary cable 51' may be attached to the object to supplement the cable 51, the cable 51' passing through a sheave 55' suitably anchored to the base member 7, with the chain or cable extending and secured to the free end of member 18. Thus, the cables 51 and 51' will be operatively connected in parallel. In such case the cable 68 connecting the opposite end of the object may be accordingly increased in size to accommodate any increased loads. Additional force could also be achieved by attaching a sheave to the adjacent end of the object, running the end of the chain 51 through such sheave and back to a fixed anchoring point on the base 7, thus multiplying the leverage, and in like manner a sheave could be attached to the opposite end of the object with the chain 68 extending through the sheave and secured to the end of the tube 2, interlocking the chain in one of the slots 72.

In connection with auxiliary chains, etc., as illustrated in Figs. 2 and 3, a chain may be readily anchored to the base 7 at any point along the I-beams 8 or 9 by engagement of an end hook 73 with the upper flange of the respective I-beams. Similarly when desired such chains could be anchored along the I-beams 13 so that a maximum amount of flexibility in the connection of such chains is afforded. In utilizing the present apparatus it may be desirable to employ auxiliary chains to the object or to connecting chains or other elements between the object and the apparatus to direct the forces in desired directions or provide a twisting or other desired action on the object. Likewise, any one of the supplemental attachments illustrated in my previous application may be employed with the present apparatus.

As heretofore pointed out, the present invention provides numerous advantages and improvements over my previous invention as well as other prior devices, enabling the substantially simultaneous straightening of a plurality of elements or members with a minimum of time and effort, and providing effective means for controlling the operation of the machine. It will be particularly noted that while my apparatus is relatively big and heavy, its operation and control approach an instrumental quality as distinguished from the comparatively crude jig or fixture-type of machine, which characteristic is further accentuated by the "subjective" operation thereof as distinguished from the "applied" operations of prior devices. Consequently, as previously mentioned, the nature of my invention is such that a new science may ultimately unfold which would be an impossibility with prior mechanical techniques.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a forming device for reforming an object and adapted to be used with a hoist mechanism operatively associated with said object, the combination of a bed structure, a beam carried by said bed structure and pivotally movable about a transversely extending axis and a flexible cable adapted to be connected adjacent one end to the beam, sheave means operatively mounted in said bed structure and extending to the rear of said transversely extending axis, said flexible cable extending rearwardly from said beam to said sheave means and about said sheave means, another flexible cable for operable connection to the object to be reformed at one end and at the other end to the beam cable thereto, said cables operatively connecting said beam when in an elevated position to oppositely disposed portions of an elevated object between which portions tension forces are to be applied as the object and beam move downwardly upon releasing said object and beam to the action of gravity upon disconnection from said hoist mechanism.

2. In a forming device for reforming an object while in an elevated position, the combination of a bed structure, a beam carried by said bed structure and pivotally movable about a transversely extending axis, an extensible member carried by said beam and axially movable relative thereto, force applying means for moving the extensible member outwardly with respect to the beam, a cable adapted to be connected adjacent one end to the extensible member, said cable extending rearwardly therefrom to adjacent the axis thereof, a sheave operatively mounted on said bed structure to the rear of said transversely extending axis, said cable further extending rearwardly from said axis to said sheave and about said sheave, another flexible cable for operable connection at one end to the object to be reformed and at the other end to the extensible member, said cables being respectively connected to oppositely disposed portions of said object when elevated with the longitudinal axis of the beam being inclined and the line of tension to be applied between such oppositely disposed portions of the elevated object forming an acute angle with such axis of the beam.

3. In a forming apparatus for reforming a hoisted object, the combination of a bed structure, an elongated beam pivotally carried by said bed structure for rotation about an axis extending transversely to the longitudinal axis of said beam, an extension member carried by and extensible from and retractable into said beam, force applying means for moving the extension member outwardly and retracting said extension member with respect to the beam, cable means extending through said beam and extending rearwardly from said axis of rotation, said cable means being connected at one end to the adjacent end of said extension member adjacent the free end of the extension member when the beam is in an elevated position, and at the opposite end to a portion of an elevated object, sheave means mounted on said beam and bed structure for mounting and directing said cable means with the sheave means on the bed structure positioned to the rear of the aforesaid axis, additional cable means for cooperation with said first-mentioned cable means and for operatively connecting said free end of the extension member directly to another portion of such an object whereby tension forces may be applied between the points of connection of the cable means to such an object when the latter and the beam move downwardly when the hoisted object and beam are released to the action of gravity.

4. In a forming apparatus for reforming a hoisted object, the combination of a bed structure, an elongated beam pivotally carried by said bed structure for rotation about an axis extending transversely to the longitudinal axis of said beam, an extension member carried by and extensible from and retractable into said beam, means for applying pressure to said member in an extending direction, adjustable control means associated with said pressure means operative to permit the extension member to move in an extending direction when the external resistance thereon is less than the adjusted pressure thereon, and to permit the extension member to retract when the external resistance thereon is greater than the adjusted pressure thereon, and means for operatively connecting an elevated object to the extension member at a point spaced from the pivotal axis thereof and at the bed structure at a point spaced rearwardly from said axis whereby tension forces may be applied between the points of connection to such an object when the latter and the beam move downwardly upon hoisted object and beam being released to the action of gravity.

5. Apparatus for reforming an object in an elevated position comprising a beam structure including a tubular body member, a tubular base member, said body member being rigidly secured to the base member with the axes of the respective member intersecting and extending at right angles to one another, said base member extending outwardly on opposite sides of the axis of the body member to form a generally T-shaped structure, a pair of tubular reinforcing members extending diagonally between the base and body members, a movable extension member co-axially positioned in said body member with the outer end of the extension extending therefrom and forming an extensible position of the T-shaped structure, power actuated means positioned in said body member adjacent the base member and operatively related to said extension member for urging the latter in an axially outward direction, a horizontally extending bed structure having a recess therein of a size to receive said base member, said recess being shaped to restrict axial and lateral movement of said base member but permit axial rotation thereof, said recess including a portion of a size to receive the body member, said reinforcing means and said extension member whereby the same may be positioned in a horizontal plane when not in use, counterbalancing means for countering the weight of said body and extension members, fixed sheave means mounted on said beam and mounted on said bed structure for mounting and directing said cable means with the sheave means on the bed structure positioned to the rear of the aforesaid axis of the base member, and cable means extending through said body member rearwardly of the axis of the base member around said fixed sheave means and for connection to such an object for restricting movement thereof in a direction toward said extension member, the opposite end of said cable means for operatively connecting to an adjacent portion of the generally T-shaped structure.

6. Apparatus for reforming an object in an elevated position comprising a beam structure including a tubular body member, a tubular base member, said body member being rigidly secured to the base member with the axes of the respective members intersecting and extending at right angles to one another, said base member extending outwardly on opposite sides of the axis of the body member to form a generally T-shaped structure, a pair of tubular reinforcing members extending diagonally between the base and body members, a movable extension I-beam member co-axially positioned in said body member with the outer end of the extension extending therefrom and forming an extensible portion of the T-shaped structure, power actuated means positioned in said body member adjacent the base member and operatively related to said extension member for urging the latter in an axially outwardly direction, a horizontally extending bed structure having a recess therein of a size to receive said base member, said recess being shaped to restrict axial and lateral movement of said base member but permit axial rotation thereof, said recess including a portion of a size to receive the body member, said reinforcing means and said extension member, whereby the same may be positioned in a horizontal plane when not in use, counterbalancing means for countering the weight of said body and extension members, and a pair of cables extending through said body member at opposite sides of the extension member and through respective diagonal reinforcing members to said base member, sheaves located adjacent the junctures of said diagonal members with said base and body members, the axes of said sheaves extending transverse to the plane of said base and body members, a pair of sheaves positioned in said base member and axes extending parallel to the axis of the latter, each of said last-mentioned sheaves being operatively aligned with one of the sheaves at the junctures of the base and diagonal members whereby each cable may pass over associated sheaves and freely move in the respective members, and a second pair of sheaves, each sheave of which is positioned rearwardly from one of the respective sheaves in said base member, each cable extending from one of said last-mentioned sheaves to and over the corresponding sheave of said second pair with the adjacent ends of said cables being adapted to be connected to such an object for restricting movement thereof in a direction toward said extension member, the opposite ends of said cables for operatively connecting to an adjacent portion of the generally T-shaped structure.

7. Apparatus for reforming an object in an elevated position comprising a beam structure including a tubular body member, a tubular base member and said body member being rigidly secured to the base member with the axes of the respective members intersecting and extending at right angles to one another, said base member extending outwardly on opposite sides of the axis of the body member to form a generally T-shaped structure, a pair of tubular reinforcing members extending diagonally between the base and body members, a movable extension member coaxially positioned in said body member with the outer end of the extension extending therefrom and forming an extensible portion of the T-shaped structure, power actuated means positioned in said body member adjacent the base member and operatively related to said extension member for urging the latter in an axially outward direction, a horizontally extending bed structure having a recess therein of a size to receive said base member, said recess being shaped to restrict axial and lateral movement of said base member but permit axial rotation thereof, said recess including a portion of a size to receive the body member, said reinforcing means and said extension member whereby the same may be positioned in a horizontal plane when not in use, counterbalancing means for countering the weight of said body and extension members, said bed structure including a peripheral flange providing means for engaging the hooked end of a cable to the base, and means for operatively connecting an elevated object to an elevated portion of said beam structure at a point spaced from the pivotal axis thereof, and to the bed structure at a point spaced rearwardly from the pivotal axis of said beam structure, whereby tension forces may be applied between the points of connection to such an object when the latter and the beam structure move downwardly upon the elevated object and beam structure being released to the action of gravity.

References Cited in the file of this patent

UNITED STATES PATENTS

| | | |
|---|---|---|
| 496,777 | Ehrgott | May 2, 1893 |
| 1,125,253 | Barber | Jan. 19, 1915 |
| 2,606,467 | Desjarlais et al. | Aug. 12, 1952 |